United States Patent
Joosten

[15] 3,658,102
[45] Apr. 25, 1972

[54] PORTABLE BAND SAW

[72] Inventor: Joseph W. Joosten, 10642 Walnut, Los Alamitos, Calif. 90720

[22] Filed: Aug. 11, 1969

[21] Appl. No.: 848,836

[52] U.S. Cl. ..........................143/27 R, 143/19 E, 143/162, 83/201.14
[51] Int. Cl. ......................................................B27b 13/08
[58] Field of Search .................................. 143/17-31, 162; 83/201

[56] References Cited

UNITED STATES PATENTS

| 120,949 | 11/1891 | Doane et al. | 153/31 X |
| 1,535,995 | 4/1925 | Getz | 143/17 |
| 3,362,445 | 1/1968 | Butzin et al. | 143/27 |
| 836,446 | 11/1906 | Kaudela | 143/162 |

FOREIGN PATENTS OR APPLICATIONS

| 710,592 | 6/1931 | France | 143/19 E |
| 549,162 | 5/1934 | Germany | 143/19 E |
| 827,410 | 1/1952 | Germany | 143/19 E |

*Primary Examiner*—Donald R. Schran
*Attorney*—Gausewitz, Carr & Rothenberg

[57] ABSTRACT

A portable band saw device including a frame supporting a prime mover which drives a first pulley, a second pulley being supported on an arm pivotally connected to the frame so that said second pulley is movable relatively toward and away from the driven pulley against the resistance of a spring, the band saw blade being extended around the two pulleys and guided by arrangements on one side of the frame, while a guard on the opposite side prevents inadvertent cutting at that location, both pulleys having provisions for adjustments of their axes of rotation, including an arrangement for tilting the arm carrying the second pulley.

2 Claims, 7 Drawing Figures

PATENTED APR 25 1972 3,658,102
SHEET 1 OF 2
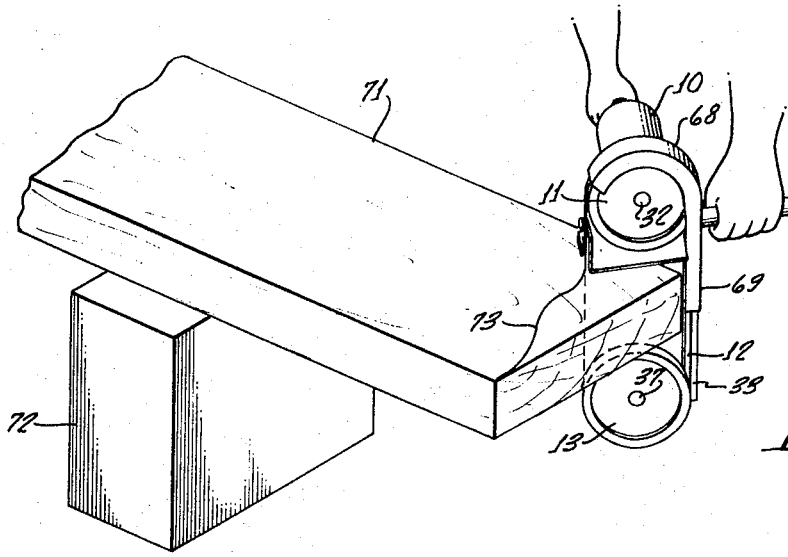
Fig. 1.
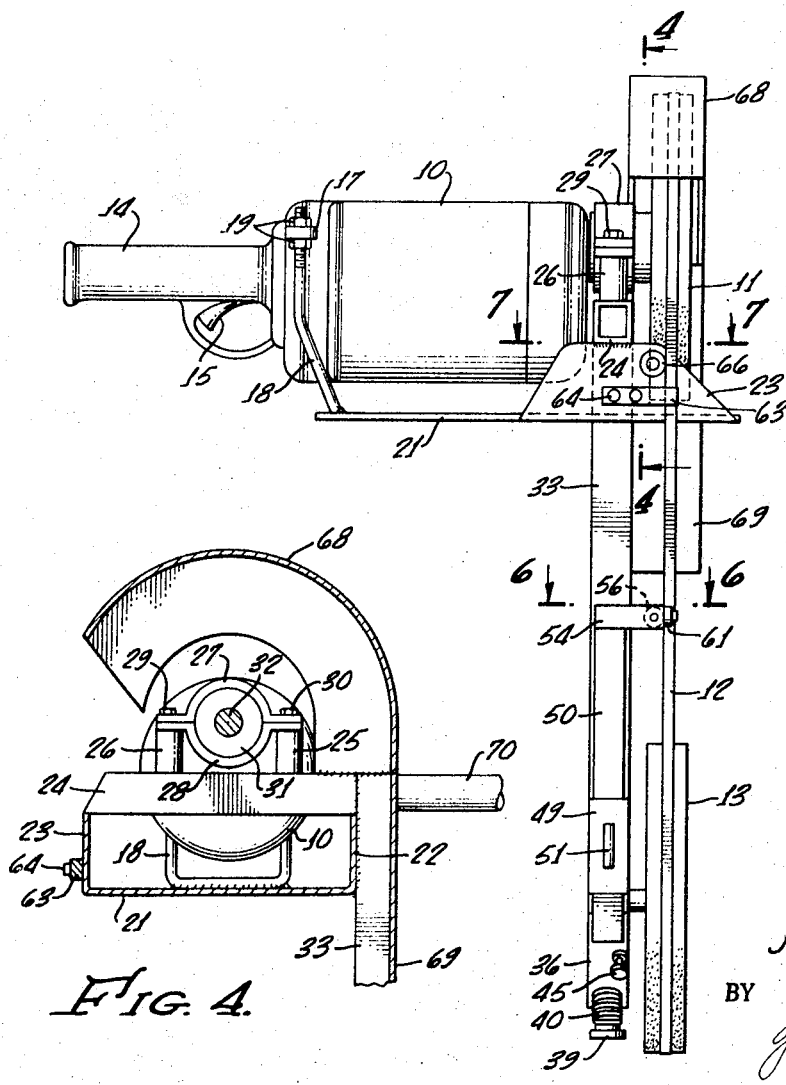
Fig. 2.
Fig. 4.
INVENTOR.
JOSEPH W. JOOSTEN
BY
Jansenwitz & Carr
ATTORNEYS.

INVENTOR.
JOSEPH W. JOOSTEN
BY
ATTORNEYS.

PORTABLE BAND SAW

BACKGROUND OF THE INVENTION

1. Field of the Invention

This invention relates to a portable saw.

The Prior Art

A band saw conventionally is a stationary device provided with a bed to support the work, while the blade runs downwardly from one pulley to the other for cutting the work as it is advanced along the bed relative to the blade. This is a very unsatisfactory arrangement for large and bulky parts because it is extremely difficult to manipulate the work so that it may be cut to an appropriate contour. For example, in house construction, often large beams must be given a scalloped contour at one end. This has necessitated the efforts of several men to lift the beam and swing one end around while the other end is directed to a saw blade by an additional man to be cut to the scalloped contour. This has been time consuming and laborious, and may provide inferior results because of the difficulty in accurately maneuvering the large beams. Moreover, the beams may weigh several hundred pounds and back injuries are not uncommon for the men who must carry the free end of the beam.

In the past, some portable saws have been devised, but these have lacked the simplicity and reliability necessary for a satisfactory portable band saw. In particular, the pulleys of prior portable band saws have been rigidly attached on fixed axes. They have had no provision for angular adjustment to assure proper tracking of the blade. The stationary axes also excess blade tension to occur during some conditions of use so that the saw blades may become broken.

SUMMARY OF THE INVENTION

The present invention provides an improved portable band saw capable of rapidly and accurately cutting large objects. It may be held at any attitude and easily operated by one man. In one example, where nine men were required for manipulating beams to cut the end contours on them with conventional band saw practices, the device of this invention accomplished the same job in 15 minutes through the efforts of only one man.

The device includes a frame supporting two spaced pulleys around which the band saw blade extends. One of the pulleys is driven by a prime mover, such as an electric motor. Cutting takes place beneath a flat plate between the pulleys, with the blade running upwardly toward the plate rather than downwardly toward a table as in a stationary band saw. The frame has a guide arrangement on one side for holding the blade in a true path and preventing its being pushed off the pulleys by the forces of the sawing operation. On the other side, a guard extends around the blade to prevent inadvertent cutting by the back side of the blade as the saw is being used.

The axle of the idler pulley is mounted on an arm on one side of a pivotal connection between the arm and the frame, so that this pulley is movable toward and away from the powered pulley by rotation of the mounting arm. A spring on the opposite side of the pivotal connection biases the idler pulley away from the powered pulley, normally holding the blade taut but allowing some give and permitting the idler pulley to move a limited distance toward the powered pulley under load conditions. This provides for resilience in the pulley mounting to avoid excess tensioning of the blade so as to prevent blade breakage. It is, at the same time, a simple and low-cost construction contrasting with the expensive machined ways used on the pulley mountings of stationary band saws.

The arm that supports the idler pulley also many be adjusted rotationally about its longitudinal axis, which permits the axis of rotation of the idler pulley to be titled relative to the one which is driven by the motor, assuring that the blade can be made to follow a true path without tending to come off the pulleys. A set screw permits retention of the setting that is made. The angular adjustment, again, is a much simpler and cheaper arrangement than that found in stationary band saws.

Also, the powered pulley may be adjusted as to its axis of rotation through a U-bolt attachment to the rearward portion of the motor connecting it to the frame. This permits the proper setting of the angle of the drive pulley with respect to the work-engaging plate without expensive machining or shimming of parts as in conventional stationary band saw designs.

BRIEF DESCRIPTION OF THE DRAWING

FIG. 1 is a perspective view of the portable band saw of this invention in use in cutting a workpiece;

FIG. 2 is a side elevational view of the band saw device;

FIG. 4 is a fragmentary transverse sectional view taken along line 4—4 of FIG. 2, illustrating the front mounting for the motor and associated parts;

DESCRIPTION OF THE PREFERRED EMBODIMENT

Figure 3:
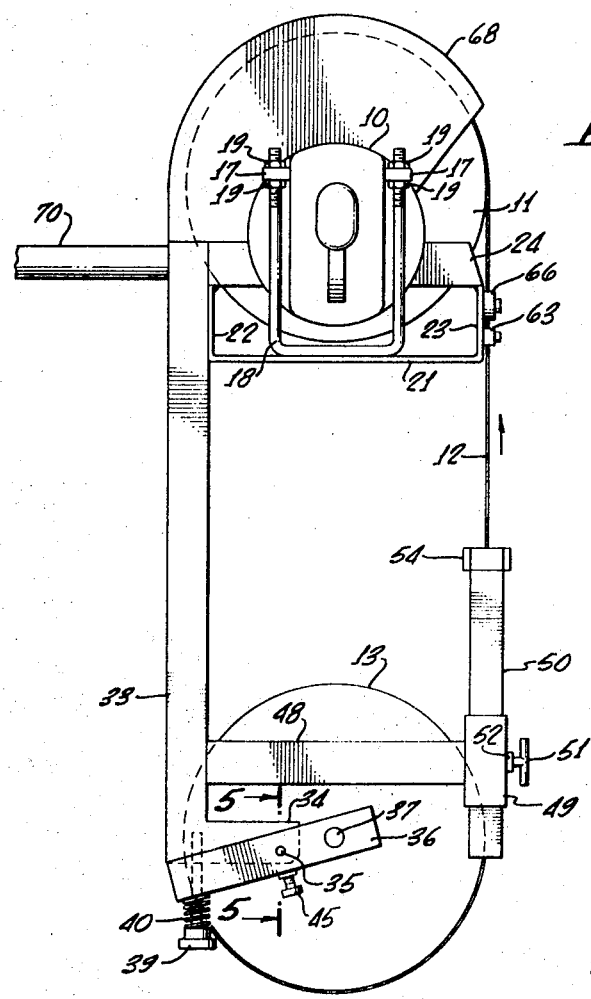
FIG. 3 is a rear elevational view of the band saw.

The portable band saw of this invention includes a prime mover 10, which turns a pulley 11, over which extends a blade 12 that is looped around a lower idler pulley 13. In the embodiment illustrated, an electric motor is used as the source of power, but a gasoline engine could be used as well. The motor 10 includes a handle 14 having a trigger 15 for switching the motor on and off.

At the rearward end of the motor 10 are tabs 17 projecting laterally from either side of the motor, each tab having an opening through it. A U-shaped bolt 18, threaded at either end, extends through the tabs 17. Two nuts 19 are received on each threaded end of the bolt 18, being positioned on either side of the adjacent tab 17 to support the rearward end of the motor. The bottom portion of the U-shaped bolt 18 is welded to a plate 21 that forms a portion of a frame assembly. The plate 21 is flat with the exception of two short side walls 22 and 23 which are bent upwardly at right angles near the forward end of the plate. Extending between the top edges of the sidewalls 22 and 23 and welded to them is a square tube 24. This member carries a pair of upstanding posts 25 and 26 (see FIGS. 2 and 4). The upper ends of the posts 25 and 26 support a pair of flanged brackets 27 and 28 which are held to the posts by screws 29 and 30. Together, the brackets 27 and 28 define a circular opening that receives a sleeve bearing 31, within which rotates the drive shaft 32 of the motor 10. In this manner, the forward end of the motor 10 is supported on the plate 21. Outboard of the bearing 31, the pulley 11 is mounted on the drive shaft 32.

The frame assembly also includes a vertically extending square tube 33 which is welded at its upper end to the end of the transverse tube 24 adjacent the sidewall 22. The bottom end of the vertical tube 33 includes a laterally projecting portion 34 which, through a transverse pin 35, pivotally mounts a channel 36 which is U-shaped in cross section. The axle 37 supporting the bottom idler pulley 13 extends through the channel 36 beyond the pivot pin 35. The axle 37 is parallel to the pivot pin 35, and projects beyond the forward side of the channel 36 for supporting the pulley 13.

On the opposite side of the pivot pin 35, a vertical screw 39 extends through a clearance opening in the channel 36 and is received in a tapped hole in the lower end of the frame assembly. Circumscribing the screw 39 is a compression spring 40, one end of which bears against the head of the screw 39 and the opposite end of which engages the outer surface of the channel 36. Therefore, the spring 40 biases the channel 36 in a clockwise direction as the device is shown in FIG. 3, urging the axle 37 of the idler pulley 13 downwardly to hold the saw blade 12 taut. However, the mounting for the pulley 13 will give under abnormal load, allowing the pulley 13 to move inwardly toward the other pulley 11 a limited amount. This may occur where the blade 12 becomes pinched or tends to stick in the work, or where there is an irregularity causing a bulge on the circumferential surface of one of the pulleys. With the pulley 13 being movable inwardly against the spring force, the tension in the blade 12 is limited, so that the blade does not become overstressed and breakage is avoided. There is tension control, as well, through rotational adjustment of the screw 39 to vary the compression of the spring 40.

The channel 36 may be rotated slightly about its longitudinal axis to in turn control the angle of the pulley 13. This is to permit proper adjustment of the angular relationship between the axes of rotation of the pulleys 11 and 13, so that the blade 12 will mate properly with them and will not come off the pulleys. The angular adjustment, shown in particular in FIG. 4, is made possible through the provision of a clearance opening 42 on the forward side of the lower tubular frame element 34 for the pivot pin 35, while on the rearward side of the frame element 34 the opening 43 for the pin 35 is substantially complementary to the pin. A screw 45, which is substantially perpendicular to the pin 35, extends through a nut 46 on the lower surface of the channel 36 adjacent the forward side and the clearance opening 42. The tension of the blade 12, acting through the pulley 13 and its axle 37, produces a moment tending to rotate the forward side of the channel 36 upwardly, so that the end of the screw is held against the undersurface of the frame element 34. Therefore, through rotation of the screw 45, the forward side of the channel 36 can be moved upwardly or downwardly as the pivot pin 35 is caused to rotate about the wall of the opening 43 in the lower horizontal frame member 34. This changes the angular position of the channel 36 relative to the frame member 34, controlling the angular position of the lower pulley 13 which is carried by the channel 36.

The top pulley 11 also can be adjusted to give it a proper angular relationship with the plate 21. Usually, the radial plane of the pulley 11 should be at an angle of around 89° with respect to the plate 21. The adjustment is effected through the nuts 19 and the U-shaped bolt 18. By raising or lowering the rearward portion of the motor 10 through appropriate rotation of the nuts 19 that engage the tabs 17, the longitudinal axis of the motor 10 may be rotated, thereby changing the angle of the pulley 11. Only slight angular adjustments are required, and the clearances at the supports 27 and 28 and the bearing 31 allow enough rotation of the motor to take place to accomplish this without the need of a separate hinge or fulcrum arrangement. The angular adjustment of the pulley 11 is very easily made at the time the saw is assembled and need not be varied from then on.

Near the bottom of the frame assembly and immediately above the lower transverse frame section 34 is a longer transverse frame element 48 welded to the vertical frame tube 33. A short square tube 49, parallel to the frame member 33, is carried at the outer end of the tube 48 and slidably receives a post 50. A set screw 51 extends through a nut 52 on the outer surface of the tube 49 and bears against the surface of the post 50 for positioning the post 50 vertically. The post 50 may be adjusted in the vertical direction by loosening the set screw 51 and sliding the post 50 within the tube 49.

Figure 6:
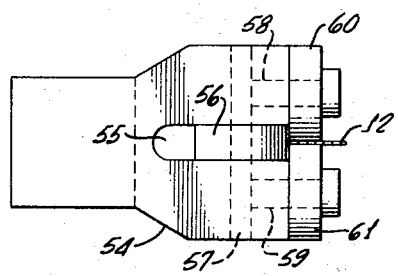
FIG. 6 is an enlarged fragmentary sectional view taken along line 6—6 of FIG. 2, showing the lower guide arrangement for the saw blade.

At the upper end of the post 50 is a bracket 54 having a central slot 55, within which is a roller 56 pivotal on a pin 57 (see FIG. 6). The axis of the pin 57 is perpendicular to the plane of the blade 12, and it is positioned so that the circumferential surface of the roller 56 bears against the rearward edge of the blade 12, thereby providing rearward support for the blade. Also carried by the bracket 54 on pins 58 and 59 are rollers 60 and 61. The circumferential surfaces of the latter elements engage the opposite sides of the blade 12. This guides the blade with respect to the frame of the machine, keeping it in a straight path between the pulleys 11 and 13, and supporting it against the forces on it during a cutting operation.

Figure 7:
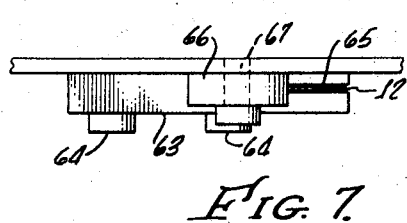
FIG. 7 is an enlarged fragmentary sectional view taken along line 7—7 of FIG. 2, illustrating the upper guide arrangement for the band saw blade.
Figure 5:
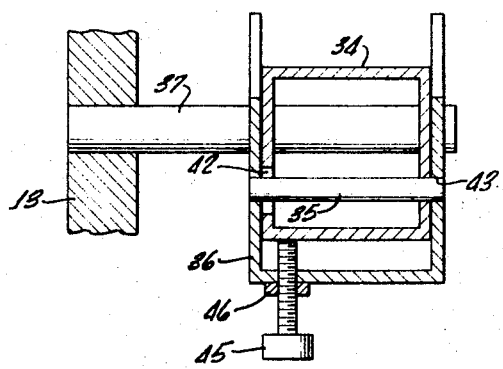
FIG. 5 is an enlarged fragmentary sectional view taken along line 5—5 of FIG. 3, showing the adjustment for the axis of rotation of the idler pulley.

An additional support and guide is provided adjacent the drive pulley 11 (see FIG. 7). This includes a member 63 secured to the sidewall 23 of the plate 21 by means of fasteners 64. At the forward end of the member 63 is a narrow guide slot 65 through which the blade 12 extends. Immediately above the member 63 is a roller 66 rotatable about a pin 67. The circumferential surface of the roller 66 engages the rearward edge of the blade 12, thereby preventing displacement of the blade to the rear.

A protective guard 68 extends around the upper portion of the drive pulley 11, being welded to the vertical frame tube 33. The guard 68 includes a depending channel portion 69 that extends down over the rearward portion of the blade 12. This is to prevent inadvertent cutting with the rearward portion of the blade when the device is in use.

Projecting outwardly from the side of the upper portion of the frame is a handle 70. This may be grasped in one hand while the motor handle 14 is held in the other, as shown in FIG. 1, allowing the saw to be supported and turned as desired without difficulty.

In operation of the saw of this invention, the motor 10 rotates the drive pulley 11 in a direction such that the forward portion of the blade 12 moves upwardly. This is unlike a conventional band saw in which the forward portion of the blade moves downwardly to cut work supported on a table. In the present instance, the work is received between the plate 21 and the bracket 54 at the upper end of the post 50. The upward force of the blade 12 maintains the workpiece in engagement with the undersurface of the flat plate 21 so that it is guided by the plate and correctly aligned with the blade. In a typical design, the throat area is nine inches by nine inches, so that sizable beams can be accommodated. For thinner workpieces, the lower guide for the blade 12 may be moved upwardly to position it closer to the undersurface of the workpiece. This is accomplished by loosening the set screw 51 and sliding the post 50 upwardly, thereby positioning the rollers 56, 58 and 59 closer to the plate 21. As shown in FIG. 1, the device is cutting a scalloped contour on the end of a beam 71. With the beam 71 held on any convenient support 72, the saw is advanced to cut off the end of the beam along the line 73 marked on the beam. The undersurface of the plate 21 rests on the end portion of the beam 71 as the cutting takes place, and the saw may be moved rapidly in imparting the precise contour to the beam end.

I claim:

1. A portable band saw device comprising
frame means,
a first pulley,
a second pulley,
said pulleys having their axes substantially in parallelism,
a continuous blade extending around said first and second pulleys,
a first means supporting said first pulley on said frame means,
a second means supporting said second pulley on said frame means,
said second means including a member,
means pivotally connecting said member to said frame means for rotation relative to said frame means about an axis substantially parallel to the axes of rotation of said pulleys so that said member is pivotally movable relative to said frame means toward and away from said first pulley,
a shaft extending outwardly from said member on one side thereof,
said second pulley being mounted on said shaft outwardly of said member on said one side thereof, and outwardly of said pivotal connecting means on one side thereof, whereby forces imposed on said second pulley by said blade produce a moment tending to rotate said member transversely, said means pivotally connecting said member to said frame means including means for allowing transverse rotation of said member, and including adjustable means for holding said member against transverse rotation and adjusting the transverse rotational position of said member for thereby adjusting the axis of rotation of said second pulley relative to the axis of rotation of said first pulley, and means resiliently biasing said member away from said first pulley, said resilient means including a spring engaging said member outwardly on the other side of said pivotal connecting means for rotationally biasing said member and thereby resiliently biasing said second pulley away from said first pulley, and means for rotating said first pulley.

2. A device as recited in claim 1 in which said member is an elongated channel, said frame means including an element received in at least a part of said channel, said means pivotally connecting said member to said frame means including a pin extending across said channel, said element having an opening receiving said pin, said opening having a clearance around said pin adjacent said one side, whereby said pin is rotatable about an axis transverse thereto for allowing said transverse rotation of said member, said adjustable means including a screw extending through said channel and engaging said element adjacent said one side for resisting said transverse rotation.

* * * * *